United States Patent [19]

Alferness

[11] 4,243,295
[45] Jan. 6, 1981

[54] POLARIZATION-INDEPENDENT OPTICAL DIRECTIONAL COUPLER SWITCH/MODULATOR

[75] Inventor: Rodney C. Alferness, Holmdel, N.J.

[73] Assignee: Bell Telephone Laboratories, Incorporated, Murray Hill, N.J.

[21] Appl. No.: 77,092

[22] Filed: Sep. 19, 1979

[51] Int. Cl.³ .................. G02B 5/14; G02F 1/137
[52] U.S. Cl. ......................... 350/96.14; 350/355
[58] Field of Search ............ 350/96.12, 96.13, 96.14, 350/96.15, 355, 356

[56] References Cited

U.S. PATENT DOCUMENTS

| 3,874,782 | 4/1975 | Schmidt | 350/96.13 |
|---|---|---|---|
| 4,012,113 | 3/1977 | Kogelnik et al. | 350/96.13 |
| 4,157,860 | 6/1979 | Marcatili | 350/96.14 |

OTHER PUBLICATIONS

Steinberg et al., "Performance Limitations Imposed on Optical Waveguide Switches . . .," *Appl. Optics*, vol. 15, No. 10, Oct. 1976, pp. 2440–2453.
Kogelik et al., "Switched Directional Couplers With . . .," *IEEE J.Q.E.*, vol. QE-12, No. 7, Jul. 1976, pp. 396–401.
Steinberg et al., "Polarization-Insensitive Integrated-Optical Switches: A New . . .," *Appl. Optics*, vol. 16, No. 8, Aug. 1977, pp. 2166–2170.
Alferness et al., "Filter Characteristics of Codirectionally Coupled . . .," *IEEE J.Q.E.*, vol. QE-14, No. 11, Nov. 1978, pp. 843–847.
Burns et al., "Interferometric Waveguide Modulator With . . .," *Appl. Phys. Lett.*, vol. 33, No. 11, Dec. 1978, pp. 944–947.
Alferness, "Optical Directional Couplers with Weighted Coupling," *Appl. Phys. Lett.*, vol. 35, No. 3, Aug. 1979, pp. 260–262.

*Primary Examiner*—John K. Corbin
*Assistant Examiner*—John D. Lee
*Attorney, Agent, or Firm*—Sylvan Sherman

[57] ABSTRACT

Because orthogonally polarized optical waves see unequal electrooptic coefficients and refractive indices for the same applied voltage, it has been difficult to obtain efficient switching of arbitrarily polarized waves. This difficulty is resolved in a reverse $\Delta\beta$ directional coupler (10, 11) which employs spatial tapering of the distance between waveguides (D(z)) for efficient through-coupling, and the appropriate choice of effective coupling strengths ($s_{TE}$, $s_{TM}$) for the two polarizations for efficient cross-coupling.

3 Claims, 4 Drawing Figures

POLARIZATION-INDEPENDENT OPTICAL DIRECTIONAL COUPLER SWITCH/MODULATOR

TECHNICAL FIELD

This invention relates to polarization-independent optical directional coupler switches/modulator.

BACKGROUND OF THE INVENTION

Guided wave optical switches/modulator demonstrated to date operate effectively for only a single direction of wave polarization. However, available single mode fibers do not preserve any particular direction of polarization. As a result, a linearly polarized optical signal applied at the input end of a fiber emerges at the output end with an arbitrary elliptical polarization that can vary with time. Under these circumstances, a single polarization switch would yield unacceptably high crosstalk and loss whenever the polarization of the received signal is different than the particular polarization for which the switch is designed.

Efforts to obviate this problem have been directed to both the fiber and the coupler. With respect to the former, specially fabricated birefringent fibers, that maintain linear polarization, are currently under investigation and have been demonstrated for only short lengths. In addition, questions concerning loss, cabling and splicing have not been addressed.

With respect to the switch/modulators, the difficulty of achieving efficient directional coupler switching (i.e., low channel crosstalk) for both the TE and the TM modes by means of a common applied voltage resides in the fact that the orthogonal modes see different electrooptic coefficients. As a result, the induced phase mismatch, $\Delta\beta$, produced by a common applied voltage, is different for the two polarizations. In addition, because the guide-substrate refractive index difference, $\Delta n$, is generally different for the TE and TM modes, the mode confinement and, consequently, the interguide coupling strength, k, is polarization sensitive. Inasmuch as k, $\Delta\beta$ and the interaction length, L, determine the crossover efficiency, the polarization sensitivity of the switch state is readily apparent.

Efforts to minimize these difficulties have involved the use of separate applied voltages for controlling the two polarizations independently. (See, for example, "Polarization-Insensitive Integrated-Optical Switches: A New Electrode Design" by R. A. Steinberg et al., *Applied Optics*, Vol. 16, No. 8, August, 1977. Also, U.S. Pat. No. 4,157,860 issued to E. A. J. Marcatili.) In general, the prior art technique is to provide two separate couplers in a single structure (i.e., one for each mode), the assumption being that each of the orthogonally applied voltages will affect only one of the two polarizations. In practice, however, second order effects can be significant, requiring a time consuming iterative tuning procedure to achieve good channel isolation for both polarizations.

SUMMARY OF THE INVENTION

A switch/modulator in accordance with the present invention comprises a pair of coupled optical waveguides supportive of TE and TM modes of wave propagation, and having an interaction length over which the coefficient of coupling for each mode tapers from a minimum at the guide ends to a maximum at a point therebetween. A split electrode configuration is employed to permit the application of reversed or uniform electric fields across the guides. The invention is characterized in that the waveguides are proportioned such that the normalized effective coupling strengths for the two modes are such that switching operation takes place in the region of the switching curve that is least sensitive to differences in $\Delta\beta$.

It is an advantage of the present invention that no special crystal cut is required. Hence, the most advantageous cut can be employed. It is a further advantage of the invention that precise values for coupling strengths are not necessary as there is a large range of $\Delta\beta$s for which the crosstalk falls within acceptable limits.

DETAILED DESCRIPTION

Figure 1:
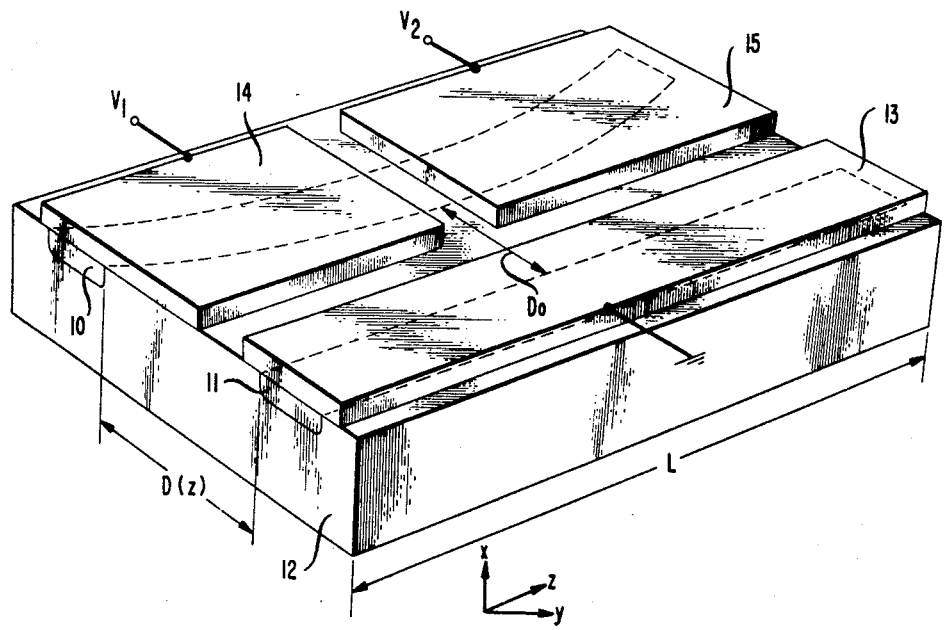
FIG. 1 shows a polarization-independent switch/modulator in accordance with the present invention.

Referring to the drawings, FIG. 1 shows a polarization-independent switch/modulator in accordance with the present invention comprising a pair of dielectric waveguides 10 and 11 embedded in an electrooptic substrate 12 of lower refractice index. The two guides are in coupling relationship over an interval, L, where the coupling coefficient, k, is weighted over said interval by appropriately varying the interguide separation by curving one or both of the waveguides. Thus, in the illustrative embodiment of FIG. 1, waveguide 10 is curved such that its distance from guide 11 is given as a function of z by D(z), where z is the distance along the guides in the direction of wave propagation. The reason for this arrangement will be discussed in greater detail hereinbelow.

A split electrode configuration is employed comprising a first electrode 13, which extends over the entire length of guide 11, and a pair of conductively insulated electrodes 14 and 15, each of which extends over half of guide 10. This permits the application of equal electric fields across both halves of the coupler for through transmission, or unequal electric fields for switching employing the alternating (sometimes called "reverse") $\Delta\beta$ effect.

The two states of an optical switch are the straight-through or bar (=) state, and the crossover or cross (x) state. In the bar state, optical energy incident in one guide emerges from said one guide. Conversely, in the cross state, energy incident in one guide emerges from the other. An important figure of merit is the resulting crosstalk, which is the ratio of the optical power at the output end of the "undesired" guide to the optical power at the output end of the "desired" guide.

Figure 2:
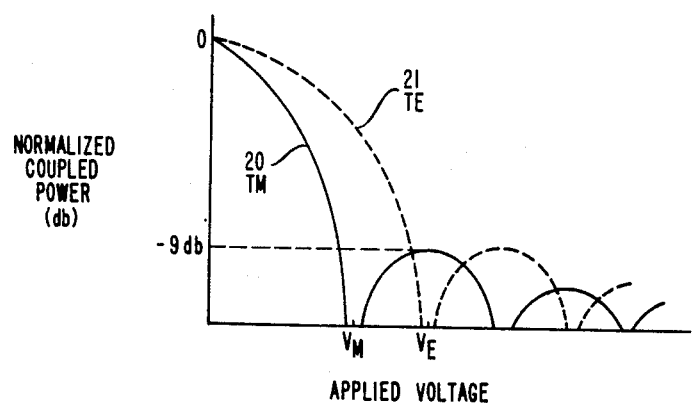
FIG. 2 shows the variation in coupled power in a directional coupler comprising parallel waveguides as a function of applied voltage.

The typical optical directional coupler, such as those formed by two, uniformly spaced, parallel waveguides, is characterized by an interaction length, L, and a coupling coefficient k. Straight-through transmission is obtained by the application of an electric field which induces a mismatch $\Delta\beta$ between the propagation constants $\beta_1$ and $\beta_2$ of the two guides via the electrooptic effect. Curves 20 and 21 in FIG. 2, show the variation in coupled power as a function of applied voltage for the TM and TE modes, respectively. Complete crossover is achieved when the guides are phase matched (V=0) and the interaction length is an exact odd multiple of the coupling length l, where $l = \pi/2k$. As the applied voltage and the resulting phase mismatch increase, the coupled power decreases, reaching a minimum at voltages $V_M$ and $V_E$ for the respective modes. A further increase in voltage produces a series of sidelobes of ever decreasing amplitude. Typically, the first sidelobe is 9 dB down.

Figure 3:
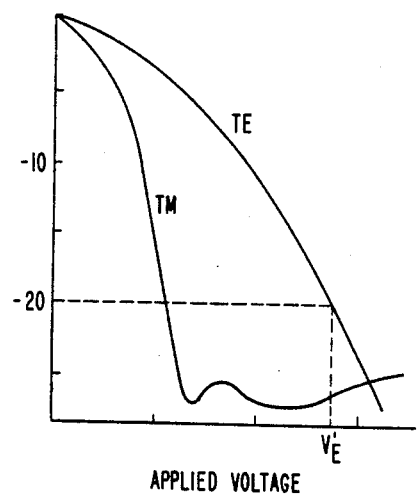
FIG. 3 shows the variation in coupled power in a spatially tapered directional coupler.

As can be seen, there are a series of voltages for each of the modes for which the coupled power is a minimum. However, because the electrooptic effects for the two modes are different, the optimum voltages for the two modes are different (i.e., $V_M \neq V_E$). It is for this reason that the prior art switches employ separate electrodes in an effort to control the two modes independently. An alternative arrangement is to reduce the sidelobes below a specified maximum by means of weighted coupling in the manner described by R. C. Alferness and P. C. Cross in their article entitled "Filter Characteristics of Codirectionally Coupled Waveguides With Weighted Coupling" published in the November, 1978 issue of the *IEEE Journal of Quantum Electronics*, Vol. QE-14, No. 11. As explained therein, the sidelobes can be suppressed by spatially tapering the coupling strength. When this is done, the coupled power loss curves are modified as illustrated in FIG. 3. The significant fact is that the sidelobes can be made sufficiently small such that the crosstalk is and remains below a specified maximum so long as the applied voltage exceeds a given value. For example, if it is specified that the level of coupled power be less than $-20$ dB, this is achieved, as illustrated in FIG. 3, when the applied voltage is greater than $V_E'$. Thus, by the use of weighted coupling, polarization-insensitive straight-through transmission can be realized by means of a single applied voltage.

Polarization-insensitive crossover is realized employing a form of alternating $-\Delta\beta$ switching. As is known, complete crossover can be achieved in a directional coupler when the two guides are phase matched ($\Delta\beta = 0$), and the interaction length is an exact odd multiple of the coupling length. There are two problems associated with these requirements. The first problem is the stringent fabrication requirements which must be met in order to satisfy the length criteria. This matter has been resolved by the alternating $-\Delta\beta$ coupler described by H. Kogelnik and R. V. Schmidt in their article entitled "Switched Directional Couplers With Alternating $\Delta\beta$," published in the July, 1976 issue of the *IEEE Journal of Quantum Electronics*, Vol. QE-12, No. 7. In this type of coupler, complete crossover is achieved by providing along the interaction length two or more sections with a mismatch $\Delta\beta$ of alternating sign. A simple way to produce an alternating $\Delta\beta$ is to provide sectioned electrodes, and to apply voltages of alternating polarities thereto. There is no requirement for an exact L/l ratio in this configuration as there is always some value of applied voltage that will produce complete crossover. If the switch is to be operated at another wavelength and l is wavelength dependent, the only adjustment that is required is a change in applied voltage. However, this technique by itself, cannot simultaneously produce complete crossover for both the TM and TE modes. As noted hereinabove, the coupling strengths, k, and the lateral waveguide evanescent penetration depth, $\gamma$, for the two modes are different due to the fact that $\Delta n_{TE} \neq \Delta n_{TM}$. Nevertheless, it has been discovered that the coupling strengths for the TE and TM modes can be equalized by the appropriate choice of waveguide and coupler parameters. In particular, it has been found experimentally that the coupling strength for either polarization is given approximately by $$k = k_o e^{-D/\gamma} \tag{1}$$

where, as noted above, the values of $k_o$ and $\gamma$ depend upon the polarization, primarily through the value of $\Delta n$. In any case, for a given set of waveguide parameters, there is a value of D for which $k_{TE} = k_{TM}$. More generally, the ratio $k_{TE}/k_{TM}$ can be made either greater or less than one. This feature will be utilized more fully hereinbelow.

For the weighted coupler used here, wherein the coupling strength varies along the interaction length, the crossover efficiency is a function of an effective coupling strength for each mode as given by $$s = \int_{-\frac{L}{2}}^{\frac{L}{2}} k(z) dz \tag{2}$$

where $$k(z) = k_o e^{-D(z)/\gamma} \tag{3}$$

As in the case of the coupler with uniform spacing, the relative values of the effective coupling strengths $s_{TE}$ and $s_{TM}$ can be controlled through the proper selection of parameters.

Figure 4:
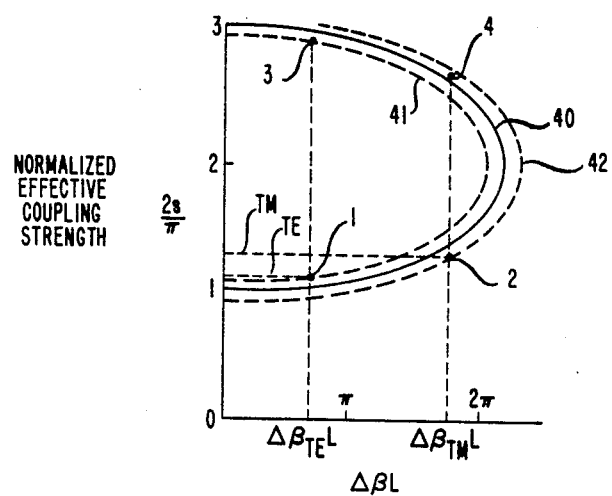
FIG. 4 shows a switching diagram for a two-section alternating $-\Delta\beta$ coupler.

Curve 40 in FIG. 4, now to be considered, shows the familiar switching diagram for a two-section, alternating $-\Delta\beta$ coupler. In the case of a weighted coupler, the vertical coordinate is the normalized effective coupling strength $2s/\pi$, and the horizontal coordinate is $\Delta\beta L$, where $\Delta\beta$ is a function of the applied voltage. What this curve indicates is that for a coupling strength $\pi/2 < s < 3\pi/2$, there is a range of voltages, given by curve 40, for which complete crossover is obtainable. However, inasmuch as $\Delta\beta_{TE} \neq \Delta\beta_{TM}$, complete crossover for both modes cannot be simultaneously realized by means of a common switching voltage. On the other hand, all that is required is that the crosstalk be maintained below a specified maximum. Accordingly, FIG. 4 also includes a pair of dashed curves 41 and 42 which indicate some specified crosstalk limits within which satisfactory operation is realizable. If now a given voltage is applied to the coupler, we obtain a $\Delta\beta_{TE}L$ and a $\Delta\beta_{TM}L$ which defines a range of points including, for example, points 1 and 2, within the limits set by curves 41 and 42. These, in turn, specify one pair of values of $s_{TE}$ and $s_{TM}$ for crossover within the given crosstalk limits. It will be noted that there are a second range of permissible operating points including, for example, points 3 and 4, that can also be used. In this latter case, however, the coupler is designed such that $s_{TM} < s_{TE}$. In either case, polarization-independent switching, within specified acceptable limits, is obtainable by means of a common applied voltage. It will also be noted that precise values of $s_{TM}$ and $s_{TE}$ are not necessary because of the large range of permissible operating points within the low crosstalk limits defined by curves 41 and 42. For example, for the case of −20 dB crosstalk, the required tolerances on the coupling strengths are no more severe than approximately 20 percent, which is well within present state of the art fabrication limits.

DESIGN PROCEDURE

There are a large number of taper functions that can be used to obtain sidelobes below 31 20 dB. However, because present fabrication techniques produce curved waveguides that vary in incremental steps rather than smoothly, other consideration, such as loss, are important. All things considered, the so-called "Hamming" taper has been found to be very suitable. It has been found experimentally to produce couplers with sidelobes of −25 dB, and does not require a large curvature. Hence, bending losses are relatively low.

The Hamming taper function is given by $$k(z) \, \alpha \left\{ 1 + 0.857 \cos \frac{2\pi z}{L} \right\} \quad (4)$$

where k(z) is the coupling coefficient as a function of z.

To determine the spacing D(z) for the desired taper, we use equation (3), where $k_o$ and $\gamma$ are experimentally measured parameters. These are different for the two polarizations, being functions of wavelength as well as the fabrication process employed and the physical parameters of the waveguides.

Solving equation (3) for D(z), we obtain $$D(z) = -\gamma \log \frac{k(z)}{k_0} \quad (5)$$

where k(z) is given by the selected taper function.

Having selected the taper function, equation (2) can also be solved for the two polarizations.

EXAMPLE

For a coupler made by diffusing 210 Å × 3 μm of titanium metal into a substrate at 980° C. for four hours, one obtains $1/\gamma_{TE} = 0.6/\mu m$ $1/\gamma_{TM} = 0.8/\mu m$ With a minimum spacing of $D_o = 3$ μm, equation (2) yields $s_{TE} = 1.7$ and $s_{TM} = 1.9$. This set of values (where $s_{TM} < s_{TE}$) is appropriate for operation at the lower end of the coupling curve 40. To operate at the upper end of the curve, where $s_{TE} < s_{TM}$, the metal thickness ($\tau$) diffused into the substrate is increased from 210 Å to 240 Å. This change also results in an overall increase in the integrated coupling s. To compensate for this, using the same relative taper function D(z/L), the overall coupler length L is increased.

Thus, in summary, the design of the coupler involves the following steps:

(1) choose k(z);
(2) determine D(z/L) using the appropriate measured values of $k_o$ and $\gamma$;
(3) choose $D_o$ (minimum spacing) and L such that the appropriate values of $s_{TE}$ and $s_{TM}$ are obtained;
(4) make final adjustments in the design by varying metal thickness ($\tau$) and, if necessary, L.

In practice, the process is much simpler than the above might appear in that there is considerable latitude ($\approx 20\%$) in the "correct" values of $s_{TE}$ and $s_{TM}$ inasmuch as the device operates in that portion of the switching curve that is substantially insensitive to changes in $\Delta\beta$.

I claim:

1. A switch/modulator comprising:
   a pair of optical waveguides (10,11) supportive of TE and TM propagating modes having an interaction length L and coefficients of coupling for said modes that taper from a minimum at the ends of said waveguides to a maximum at a point therebetween;
   and means (13,14,15) for impressing voltages ($V_1$, $V_2$) across selected portions of said waveguides;
   characterized in that:
   the waveguide parameters are such that the resulting normalized integrated coupling strengths $2s_{TE}/\pi$ and $2s_{TM}/\pi$ for said modes are between 1 and 1.3 or between 2.7 and 3;
   and in that $s_{TM} > s_{TE}$ in the region 1 to 1.3; and $s_{TM} < s_{TE}$ in the region of 2.7 to 3.

2. The switch/modulator according to claim 1 wherein $V_1 = V_2$ for straight-through transmission and $V_1 = -V_2$ for crossover transmission.

3. The switch/modulator according to claim 1 wherein the coupling coefficient k(z) is given by $$k(z) \, \alpha \left\{ 1 + A \cos \frac{2\pi z}{L} \right\} \, .$$

where A is a constant.

* * * * *

UNITED STATES PATENT AND TRADEMARK OFFICE
CERTIFICATE OF CORRECTION

PATENT NO. : 4,243,295
DATED : January 6, 1981
INVENTOR(S) : Rodney C. Alferness It is certified that error appears in the above—identified patent and that said Letters Patent is hereby corrected as shown below:

Column 5, line 8, "31 20" should read -- -20--; line 50, "$s_{TM} < s_{TE}$" should read --$s_{TM} > s_{TE}$--. Column 6, line 1, "$s_{TE} < s_{TM}$" should read --$s_{TE} > s_{TM}$--.

Signed and Sealed this

Twelfth Day of May 1981

[SEAL]

Attest:

RENE D. TEGTMEYER

Attesting Officer     Acting Commissioner of Patents and Trademark